Aug. 24, 1965   W. F. GALEY ETAL   3,202,043
METHOD AND APPARATUS FOR PHOTOELECTRICALLY INSPECTING GLASS
Filed Oct. 2, 1964   6 Sheets-Sheet 1

INVENTORS
GEORGE E. SLEIGHTER
HUGH E. SHAW JR and
BY WILLIAM F. GALEY

Oscar L. Spencer
ATTORNEY

Aug. 24, 1965   W. F. GALEY ETAL   3,202,043
METHOD AND APPARATUS FOR PHOTOELECTRICALLY INSPECTING GLASS
Filed Oct. 2, 1964   6 Sheets-Sheet 4

INVENTORS
GEORGE E. SLEIGHTER
HUGH E. SHAW JR and
BY WILLIAM F. GALEY

Oscar P. Spencer
ATTORNEY

FIG. 14

INVENTORS
GEORGE E. SLEIGHTER
HUGH E. SHAW JR and
BY WILLIAM F. GALEY

Oscar L Spencer
ATTORNEY

United States Patent Office 3,202,043
Patented Aug. 24, 1965

3,202,043
METHOD AND APPARATUS FOR PHOTOELECTRICALLY INSPECTING GLASS
William F. Galey, Saxonburg, Hugh E. Shaw, Jr., New Kensington, and George E. Sleighter, Natrona Heights, Pa., assignors to Pittsburgh Plate Glass Company, Pittsburgh, Pa., a corporation of Pennsylvania
Filed Oct. 2, 1964, Ser. No. 405,001
18 Claims. (Cl. 88—14)

This application is a continuation-in-part of our copending Serial No. 850,304, now abandoned, filed November 2, 1959, and assigned to the assignee of this application.

This invention relates to the automatic inspection of polished plate glass in order to locate various defects whose presence impairs its optical and mechanical perfection.

Glass manufacturers attempt to produce polished plate glass sheets, without defects, having planar surfaces in perfect parallelism with each other. Unfortunately, plate glass as produced today falls short of this ideal. However, as various grades of plate glass are required for various purposes, certain defects, if not too severe, may be permitted. For example, highest quality mirror glass has optical requirements far in excess of those necessary for commercial plate glass, so that while certain, not severe, defects may be permitted in plate glass for high quality mirrors, other defects causing rejection of a silvered mirror are acceptable for commercial plate glass.

There are four types or families of defects which frequently may be present in the body of or on the surface of polished plate glass sheets and which mar the optical properties of polished plate glass sufficient to be discerned by the human eye.

The first family of defects, referred to as type A defects, are microscopic surface defects. These defects are not localized, but are distributed over relatively wide areas of the glass surfaces. Such defects susceptible of discernment are sweep, peel and short finish.

Sweep, a defect generally attributed to improper polishing, is characterized by a plurality of parallel, arcuate, shallow grooves of smoothly varying depth, and possesses a comparatively regular pattern having a modified sinusoidal elevational configuration across a section of glass. The width of such grooves generally varies from about 200 to about 800 microns, and the greatest depth varies from about 0.1 to about 0.2 micron.

Peel is characterized by irregular variations on the surface of plate glass, or non-planar elemental areas not lying in the same plane as the gross surfaces of the glass, and take the form of irregularly dispersed, shallow depressions having rounded edges and rounded bottoms. While polished plate glass should be optically flat or have a focal length of infinity, these elemental areas perform optically as minute lens and have a distribution of focal lengths less than infinity. The width of such depressions varies from about 200 to about 800 microns and the depth varies from about 0.1 to about 2 microns.

Short finish, resulting from incomplete polishing, characterizes glass having elemental areas that have not been polished completely to the plane of the gross surface of the glass. The surface is pitted with sharp, irregularly surfaced indentations scattered through the surface. The depth of short finish pits varies generally from about ½ to about 10 microns, and the width from about 2 to about 40 microns.

The second family of defects, referred to as type B defects, exist within the body of polished plate glass and result from incomplete blending of the various batch ingredients during the glass melting and fining operations and extend generally in the direction of draw of the glass. These defects are strings, striae, and ream. When the inhomogeneities are generally oriented so that their length is aligned with the direction of glass draw and the planes of inhomogeneities are generally normal to planes of glass surfaces, the defect is called stria. When the inhomogeneities are aligned so that their major axes are oriented to extend in planes parallel to the glass surfaces, the defect is called ream. Strings are relatively thin, elongated, straight or gradually curled lines resulting from a slow solution of a large grain of sand or foreign material. While pure ream does not affect the optical properties of a glass sheet viewed normal to its surface, striae or any orientation of inhomogeneities containing a stria component of certain magnitude impairs the optical perfection of polished plate glass. All of these defects should be detected before any local area containing these defects are included in a large plate glass sheet.

A third class of defects, referred to as type C defects, are those of the point type, which may be within the glass, i.e., of the inclusion type, or may be present at the surface of the glass. Inclusion type defects include stones, boils, blisters and seeds. Stones are solid inclusions of refractory material that have failed to melt into the glass, or are formed as a consequence of glass manufacture. Boils and seeds are gaseous inclusions, seeds being on the order of $\frac{1}{10}$ to $\frac{1}{2}$ millimeter in diameter and boils being larger. Blisters are elongated boils, usually being a fraction of a millimeter wide and several millimeters long. Surface point type defects include sand holes, and bloach. Sand holes are small fractures in the surface produced from the rough grinding operation, which have not been removed by subsequent fine grinding, and are generally 40 to 1000 microns wide and about 10 to about 250 microns deep. Bloach may consist of groups of sand holes as a result of incompletely fine grinding plate glass, caused by a low place in the plate which retains part of the original rough ground surface.

The fourth type of defects, generally referred to as type D defects, are gross linear surface defects, broadly classified into scratches and sleeks. Scratches, usually a linear or arcuate series of conchoidal fractures are long, deep, narrow defects in the glass surface having lengths varying from millimeters to meters, widths up to about a millimeter and depths on the order of hundreds of microns. Scratches are known under various names, such as block rakes, cullet cuts, runner cuts, and deck scratches, depending upon their origin.

Sleeks are very fine, smooth-walled indentations in a glass surface, usually produced by a foreign particle in the polishing operation. Their lengths may vary from millimeters to meters, their width from about 10 to about 100 microns, and their depth from about ½ to 2 microns. Donut marks may be catalogued with either sleeks or scratches, depending upon their severity.

Usually plate glass, after being ground and polished, is visually inspected for the presence of the various defects described which affect its optical and mechanical properties and the inspectors mark the defect locations with chalk or crayon. This procedure is time consuming and requires a large number of specially trained personnel and, due to differences of opinion between the inspectors, leads to a lack of uniformity in the grading of glass.

It is proposed, according to the teachings of this application and the copending applications of Hugh E. Shaw, Jr.; George E. Sleighter and Joseph S. Zabetakis, Serial Numbers 850,347 and 850,312, respectively, all filed concurrently herewith, to provide methods and apparatus for automatically inspecting ground and polished plate glass, the applications being directed to a method and apparatus for automatically inspecting glass for the presence of type A and type B defects, respectively. Automatic inspection, as opposed to visual inspection, provides for the establishment of uniform standards for the grading of the glass into the particular required qualities and may be accomplished while the glass is moving along a continuous line either in the form of discrete sheets or a continuous ribbon from the grinding and polishing stations to stations where the sheets or ribbons are cut into smaller, commercial size sheets. A factor of great importance in such an operation is that the glass need not be removed from the line for inspection as is the usual situation when the glass is manually inspected, thus providing a more continuous manufacture of the sheets of plate glass.

To determine the manner of cutting the glass into small sized sheets the polished plate glass, while on a continuous line, is passed through a series of detectors, each capable of distinguishing a different type or family of optical defect. Means may be associated with each detector whereby an electrical signal indicating each defect detected is fed into a recording or defect storage device and a computer which determines the optimum manner of cutting the glass to remove the various imperfections detected, or into a marking device which marks each defect location directly on the glass, so that a cutter may determine the optimum manner of cutting the glass.

The instant application is specifically directed to a method and apparatus for detecting defects of the beforementioned types C and D.

When light from a source is passed through defect-free glass and intercepted by an objective lens a projected image of the glass will be formed, which projected image will have a substantially uniform light field. When defects of type C are present in and on the glass, such defects will show as dark spots on the light field because they absorb light or have extremely short focal lengths. Defects of type D will also show on this field in much reduced intensity contrast because they affect the rays producing the projected image to a much lesser extent. Type D defects deviate or scatter some of the light thus acting as secondary light sources on the glass surfaces. To be able to distinguish D defects and determine their severity it is necessary to detect their presence separately from C defects, and thus it becomes necessary to separate the principal rays of light, i.e., those emanating from the aforementioned light source, carrying C type defect information from the scattered light carrying D type defect information. When thus separated, the objective lens can be made to simultaneously present images of the glass, in one case a projected image displaying C type defects and in the second case, a dark field image on which the scattered rays will present representations of D type defects as light spots.

Broadly, the invention herein described employs the technique of the aforementioned scanning image planes. Rotary scanning discs having a plurality of arcuate slots perform the scanning operations each in conjunction with a disc having an elongated slit therein, the slits being aligned across the width of the glass. The area of the aperture formed by the combination of the slot and the slit is chosen so that the interrupted light intensity when a defect is present differs significantly from the light intensity when a defect is not present and is also chosen so that the severity of the defect may be determined by this varying light intensity. Light of varying intensities passes through the aperture and impinges upon a light sensitive element, preferably a photomultiplier tube, to produce signals which vary according to the light intensity, and therefore such signals are indicative of the presence and severity of defects in and on the glass. Electrical circuitry associated with the photomultiplier converts the signals into usable form.

Thus, as broadly and generically described above, the invention encompasses scanning a light field image for dark spots indicative of type C defects and, also, scanning a dark field image for light spots indicative of type D defects.

As will be apparent as the description proceeds, separate devices may be used for detecting the presence of C and D type defects, or one composite assembly may be used for detecting both types of defects, such composite assembly having a common light source and means to eliminate interference between the principal light rays and the scattered light rays at a point where the principal rays are brought through a focus by the objective lens and substantially all the scattered light from the secondary light source, i.e., type D defects, are not focused.

In order to determine the defect locations relative to an entire glass sheet or ribbon, a plurality of scanning devices are arranged across the width of the glass, each arranged to scan a predetermined area of the glass. When the glass is in motion along a predetermined path, each scanning device will scan a predetermined longitudinal area of the glass.

Therefore, the primary object of this invention is the provision of apparatus for automatically inspecting ground and polished plate glass for determining the location and severity of defects of the aforementioned types C and/or D.

Another object of this invention is the provision of an improved method for inspecting ground and polished plate glass for the location and severity of defects of the aforementioned types C and/or D.

These and other objects and features of the invention will become apparent from the following description when taken with the following drawings in which.

Figure 1:
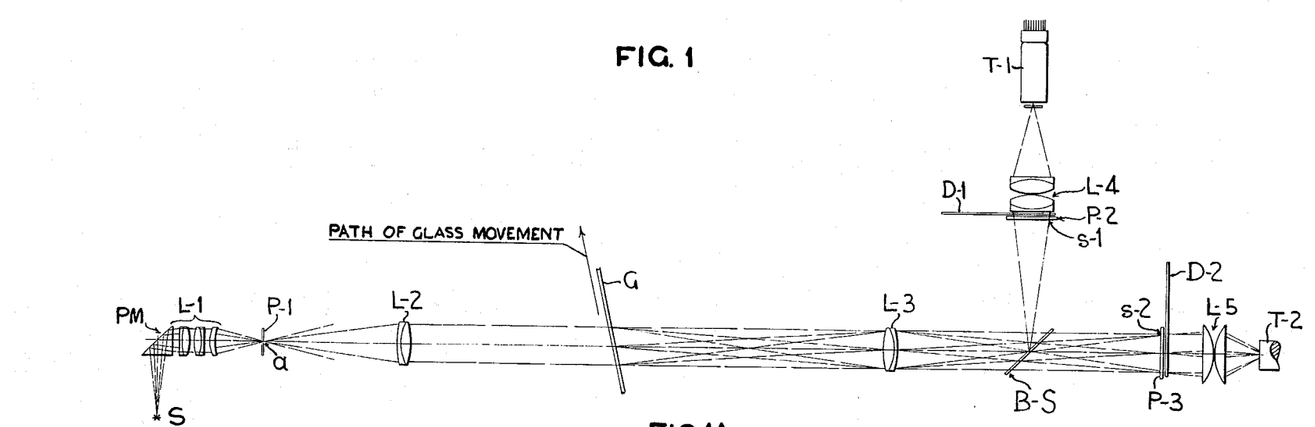
FIGS. 1, 1A and 1B are sectional ray diagrams of inspection devices constructed according to this invention, illustrating some of the component parts and their relation to the direction of draw of the glass; the shifting of the light rays by the glass and the light beam separator because of refraction not being expressly shown or indicated.

Looking at the drawings and in particular to FIG. 1 illustrating the ray diagram of a combined inspection device for both type C and D defects, we see from left to right a source of light S, a prism PM for changing the direction of light from the source, a lens system L-1 for focusing the light at a location where there is disposed a plate P-1 having a central aperture $a$, and a collimating lens system L-2, the source, prism, lens system L-1, plate P-1 and collimating lens system L-2 being disposed adjacent one side of the plane of the glass G. Because the glass preferably moves relative to the device, the path of movement of the glass is indicated by an appropriate legend and arrow. The optic axis of the device is preferably at an angle of substantially 78 degrees to the plane of the glass to avoid interfering reflections between the optics of the device and the glass being examined. Disposed adjacent the other side of the glass plane are an objective lens system L-3, a light beam separator BS for separating the principal light rays and scattered light rays, preferably taking the form of a transparent glass plate with a relatively small central mirrored portion. The mirrored portion reflects the principal beam of light in a direction normal to its original axis. Aligned with the reflected axis of the principal beam of light are a normally positioned plate P-2 having a relatively narrow slit $s-1$ located at the image plane of the glass G as determined by the objective lens L-3, an adjacent rotary scanning device D-1 preferably having four arcuate slots which traverse the slit $s-1$, a condensing lens system L-4 and a light sensitive element, preferably a photomultiplier tube T-1. In a similar manner, aligned with the axis of the scattered light beam are a normally positioned plate P-3 having a relatively narrow slit $s-2$, located at the image plane of the glass as determined by the objective lens L-3, an adjacent rotary scanning device D-2 of similar construction to D-1, a lens system L-5 and a light sensitive element, preferably a photomultiplier tube T-2. The lens system L-5 demagnifies the objective lens image of the combined system at the photomultiplier tube T-2, so that the light from the line type defects (type D) have the smallest dimension possible on the face of the tube T-2. Concentration of the light is desirable because usually the cathodes of tubes, such as T-2 have non-linear characteristics over their area and using only a small area of the cathode substantially insures a linear characteristic.

Figure 1A:
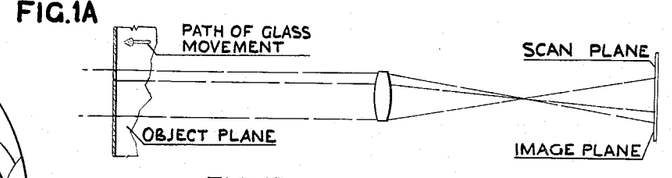
Figure 1B:
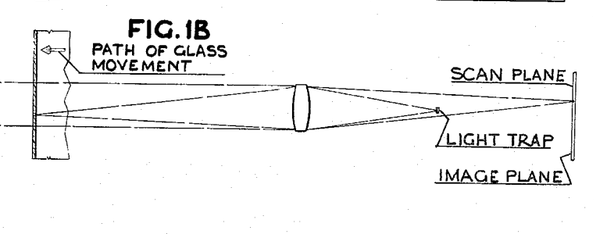

FIGS. 1A and 1B show ray diagrams of inspection ray diagrams, the sources of light and associated elements to the left of the glass plane (as viewed in the drawing) are the same as that illustrated in FIG. 1.

In FIG. 1A, adjacent the other side of the glass plane, there is disposed the objective lens system L-3, the plate P-2 with the slit $s-1$, the scanning device D-1 all of the same preferred construction, the lens system L-4 and the light sensitive element, i.e., the photomultiplier tube T-1. Note, however, that the optic axis of this arrangement coincides with the optic axis of the light source and associated elements. While there is no light beam separator employed, effects of the rays of scattered light from D type defects are negligible as previously explained.

In FIG. 1B, adjacent the other side of the glass plane, there is disposed the objective lens system L-3, a light trap LT, the plate P-3 with the slit $s-2$, the scanning device D-2 all of the same preferred construction, the lens system L-5 and the light sensitive element, i.e., the photomultiplier tube T-2. The light trap LT allows only the scattered light rays to pass and fall at the image plane of the glass as determined by the objective lens system L-3, i.e., at the plane of the plate P-3.

*Light source*

Figures 2, 3, 9, 10:
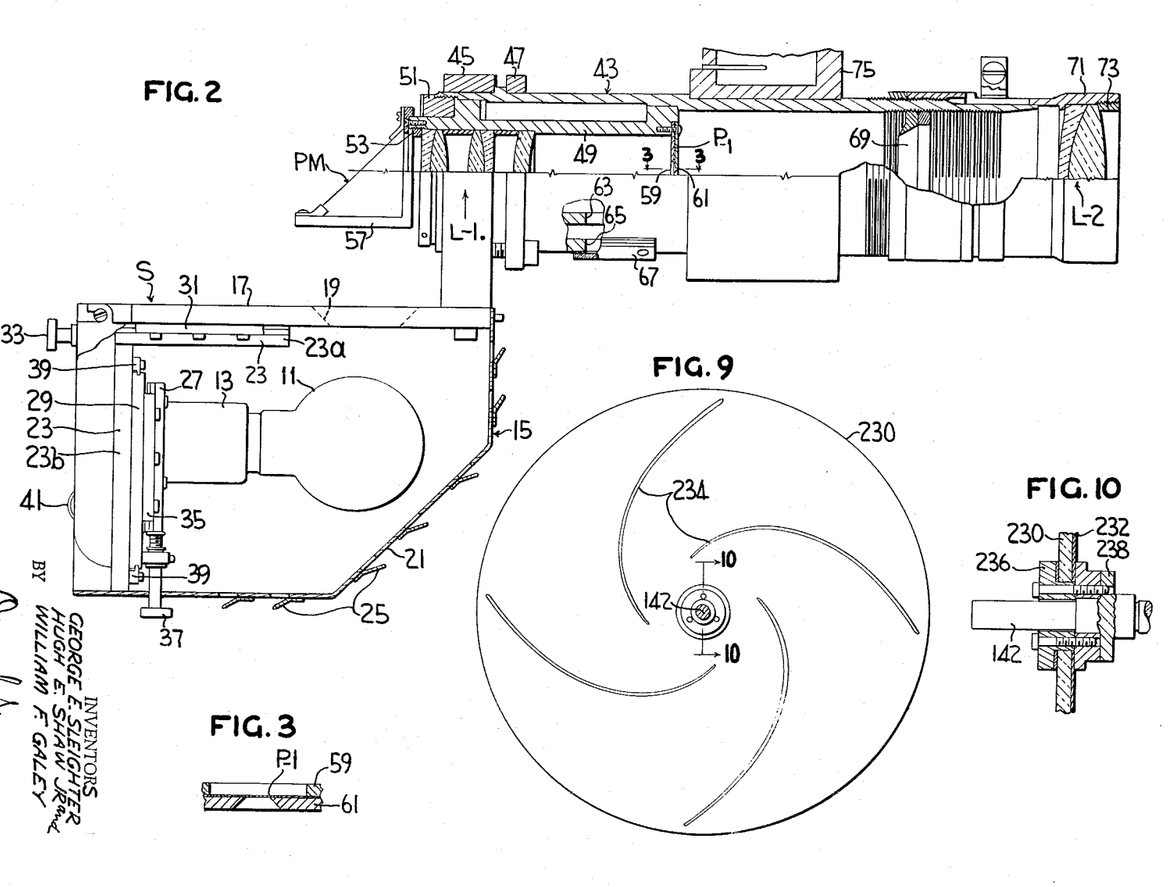
FIG. 2 is an illustration, partly in section, of a light source and associated structure of an inspection device of this invention.
FIG. 3 is an enlarged view taken on line 3—3 of FIG. 2.
FIG. 9 is a view of a rotating scanning disc.
FIG. 10 is a view taken on line 10—10 of FIG. 9.

Turning now to FIG. 2, showing the structural details of the light source S and associated parts which are disposed adjacent one side of the plane of the glass, from left to right, there is the source of light S taking the form of a lamp or bulb 11 chosen for its characteristic of intrinsic brightness with its base received within a socket 13 connected to a source of regulated electrical power (not shown). The socket 13 and the bulb are adjustably positioned within a lamp housing 15 which includes a front plate 17 having an aperture 19 with a tapered wall therethrough for the passage of light from the bulb, a cover 21 and an L-shaped base plate 23 having legs 23a and 23b. The adjustability of the position of the lamp 11 allows proper focusing of its rays, as will be later explained. The cover 21 is provided with a plurality of louvres 25 for the dissipation of heat from the bulb 11. The socket 13 is fixed to a plate 27 and a plate 29 is interposed between the plate 27 and the leg 23b of the base plate 23.

The leg 23a of the base plate 23 is slidably received within a pair of spaced, parallel guide tracks 31 (only one of which is shown) fixed to the plate 17 and extending horizontally, as viewed in the drawing. An adjusting screw 33 having a portion of its length rotatably fixed to the front plate 17 and a portion of its threaded length received within a threaded portion of the base plate 23 is provided for adjusting the position of the base plate 23 relative to the front plate 17. Upon rotation of the screw 33, as is obvious, the base plate 23 is moved in the tracks 31 and relative to the plate 17. The plate 27 is slidably received within spaced, parallel guide tracks 35 (only one of which is shown) fixed to the plate 29 and extending from front to back relative to the housing 15. An adjusting screw 37, mounted in a manner similar to the screw 33 provides a means for adjusting the front-to-back position of the lamp 11 relative to the housing. The plate 29 is slidably received within spaced, parallel guide tracks 39 fixed to the leg 23b of the base base plate 23 which extend from side-to-side relative to the housing 15. An adjusting screw 41, mounted in a manner similar to the screw 33, provides a means for adjusting the side-to-side position of the lamp 11 relative to the housing 15.

An elongated tubular member 43 is received within a holding ring 45 fixed to the plate 17 of the housing 15, the holding ring abutting an annular shoulder formed on the member 43. The member 43 is rigidly fixed in the illustrated position by a clamp ring 47 surrounding the member 43 and abutting the shoulder, the clamp ring 47 being bolted to the holding ring 45.

A cylindrical lens holder 49 is received within the tubular member 43 and is retained in position by an annular nut 51 threadably received within the tubular member 43. The opposite end of the lens holder abuts an internal shoulder formed in the tubular member 43. The cylindrical lens holder 49 supports the lens system L-1 fixed within the holder by an annular lock nut 53.

The prism PM fixed in position within a prism holder 57 is attached to the terminal end of the cylindrical lens holder 49. One base of the prism is positioned directly above the opening 19 in the plate 17 of the light source housing 15 and another base of the prism is disposed adjacent the lens system L-1, so as to change the direction of light rays from the bulb 11. The lens system L-1 is of multiple element construction for focusing light from the source S at the apertured plate P-1 (see also FIG. 1). The plate P-1 having the center aperture $a$ is extremely thin and is positioned between a pair of thicker support plates 59 and 61, each having relatively large central apertures therethrough. The details of this construction are illustrated in FIG. 3. The aperture $a$, preferably on the order of 0.030 inch diameter, becomes the effective point source of light for the device being described. The assembly of support plates 59 and 61 and aperture plate P–1 is connected to the lens holder 49.

The lens holder 49 is formed with an opening 63 which when properly positioned is aligned with an opening 65 formed in the tubular member 43. A transparent cover plate 67 is provided over the latter described opening and is attached to the member 43. The two openings provide a means whereby the proper positioning of the bulb 11 with the light rays focusing at the aperture $a$ may be visually determined. The means for positioning the bulb 11 has been previously described.

The tubular member 43 is internally and externally threaded adjacent its terminal end removed from the housing 15 and internally receives a reflection stop member 69. A cylindrical lens cage 71 is externally received and clamped on the member 43 and is positioned by an annular lock nut. The lens cage 71 carries the collimating lens system L–2 of multiple element construction and which is fixed in position within the cage by an annular lock nut 73. To prevent reflections of light within the tubular member 43, its interior is preferably optically threaded throughout its length and provided with a non-reflective coating. A mounting bracket 75 surrounds the member 43 intermediate its length and forms the means by which the described structure is mounted on a bridge for use, as will later be described.

*Combination scanning device*

Figures 4, 5, 6, 8:
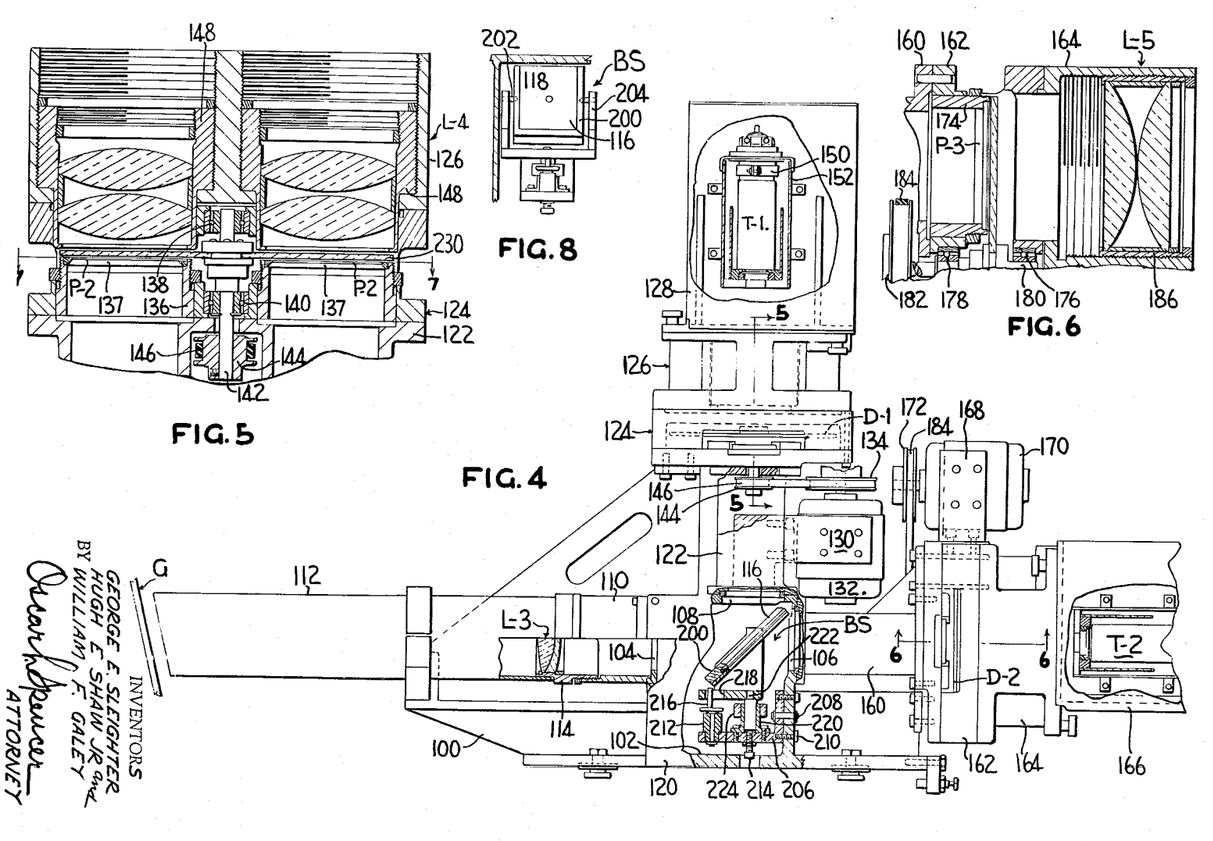
FIG. 4 is an illustration of a combination scanning device, partly in section, illustrating the rotating scanning discs, optics for impinging light onto the multiplier tubes, the photomultiplier tubes, associated components and the housing for these components.
FIG. 5 is a section taken on line 5—5 of FIG. 4.
FIG. 6 is a partial sectional view taken on line 6—6 of FIG. 4.
FIG. 8 is a view of a light beam separator and its mounting.
Figure 7:
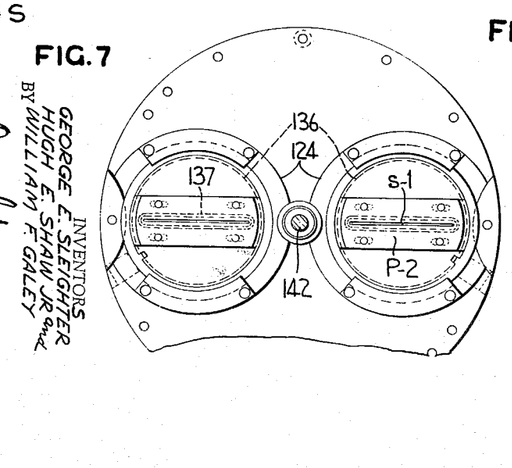
FIG. 7 is a partial view taken on line 7—7 of FIG. 5 and showing the slotted discs, each having a slit therein which cooperates with the rotary scanning device.

Attention is now directed to FIGS. 4 to 10 wherein the structure positioned adjacent the other side (as shown in FIG. 1) of the glass plane carrying the photomultiplier tubes T–1 and T–2 and other associated elements is illustrated. It will be noted, as indicated in FIGS. 5 and 7, that the device is constructed of multiple, side-by-side elements. This provides economy of construction, allowing the use of one scanning disc, such as D–1 or D–2, for two scanning devices. The description which follows will be limited to one complete device because each half of the construction is identical.

The structure comprises a casting 100 having portions defining an open-sided chamber 102 with a front opening 104, a back opening 106 and a top opening 108. Concentric tubular members 110 and 112 are connected to the casting 100 in alignment with the opening 104. The lens system L–3 is fixed in a lens holder 114 which forms the juncture of the tubular members 110 and 112. Note that the terminal end of the member 112 is angled relative to its major axis, and the structure being described is supported with the end of the member 112 parallel to the plane of the glass G.

The light beam separator BS is illustrated as being a transparent rectangular glass plate 116 having a central mirrored portion 118 and is supported for various adjustments within the chamber 102, the latter having its sides closed by closures 120 (only one of which is shown). The specific details of the light beam separator and its support will be later fully described.

A tubular member 122 is connected to the casting 100, so as to be aligned with the opening 108, the member 122 joining a disc housing 124 which provides a cavity in which the disc D–1 is received. A lens support housing 126 is connected to the disc housing 124, and a photomultiplier cover 128 is connected to the housing 126.

A bracket 130, cast integral with or fixed to the main casting 100, as viewed in the drawing, is positioned behind the member 122. (In actual construction, the bracket 130 is between a pair of members 122 because the parts are duplicated.) An electric motor 132 is fixed to the bracket 130, the motor having a pulley 134 connected to its shaft to provide means for rotating the disc D–1.

The housing 124 (see FIG. 5) receives short tubular elements 136 aligned with the members 122, each of which carries a relatively thin plate P–2 with the slit $s$–1 therethrough. As is apparent from FIG. 7, the plate P–2 is strengthened by abutting a support plate 137 having a larger opening than slit $s$–1 and is constructed for precise positioning by the method in which it is mounted, as for example, the ring nuts surrounding the element 136 (FIG. 5). As apparent from FIG. 5, the housings 124 and 126 receive bearings 138 and 140 in which the shaft 142 of the disc D–1 is journaled. A pulley 144 is connected to the shaft 142 and receives a belt 146 which connects the pulleys 134 and 144, thereby providing the driving connection between the motor 132 and the disc D–1.

The housing 126 receives cages 148 each aligned with the members 122 and each carrying a multiple-element lens system L–4, each cage being fixed in position, as illustrated. The housing 128 covers the photomultiplier tube T–1. The tube T–1 is received within a socket 150 and is surrounded by a shield 152. The electrical connections to and from the tube T–1 are not illustrated in FIG. 5, but will be explained later.

A tubular member 160 is connected to the casting 100, so as to be aligned with the opening 106, the member 160 joining a disc housing 162 which provides a cavity in which the disc D–2 is received. A lens support housing 164 is connected to the disc housing 162 and a photomultiplier cover 166 is connected to the housing 164.

A bracket 168 is connected to the housing 162, and an electric motor 170 is fixed to the bracket. The motor 170 has a pulley 172 connected to its shaft to provide a means for rotating the disc D–2.

The housing 162 (see FIG. 6) receives short tubular elements 174 aligned with the members 160, each of which carries a relatively thin plate P–3 with the slit $s$–2 therethrough. The construction as to support plates and adjustment is the same as that described with reference to FIGS. 5 and 7. The housings 160 and 162 receive bearings 176 and 178 in which the shaft 180 of the disc D–2 is journaled. A pulley 182 is connected to the shaft 180 and receives a belt 184 which connects the pulleys 172 and 182, thereby providing the driving connection between the motor 170 and the disc D–2.

The housing 164 receives lens holders 186, each aligned with the members 160 and each carrying a multiple-element lens system L–5, each holder 186 being fixed in position, as illustrated. The housing 166 covers the photomultiplier tube T–2. The tube T–2 is connected in a similar manner to the tube T–1, and its electrical connections will be later described.

The light beam separator BS (see FIGS. 4 and 8) comprises the plate 116 having the central mirrored portion 118. The mirrored portion 118 is elliptical in shape and on the front surface of the plate 116 with its major axis extending from top to bottom, as viewed in the drawings. The plate 116 is mounted in a substantially V-shaped frame 200 which is in turn pivotably mounted, by means of pivot members 202, with respect to a yoke 204. The axes of members 202 pass through the center of the mirrored portion 118, and by the pivotable construction, the angularity of the separator BS may be adjusted.

An L-shaped bracket 206 is fixed to the casting 100 within the chamber 102 by a pivot pin 208 and bolts 210 passing through slots in the casting 100. One leg of the bracket 206 is provided with openings to receive a sleeve 212 and a socket-headed screw 214. The sleeve 212 receives an eccentric pin 216 extending within an elongated slot 218 in the yoke 204. A cylindrical sleeve 220 having a split threaded end is fixed to the bracket 206 concentric with the opening receiving the screw 214 and receives a frame pin 222 having a reduced terminal portion receivable within an opening in the yoke 204. A threaded nut 224 is disposed about the sleeve 220, so that upon tightening the nut the pin 222 may be fixed in a desired position. As will be easily understood, turning the eccentric pin 216 rotates the base of the yoke 204 about the pin 222, thereby providing side-to-side adjustment of the plate 116, and rotating the screw 214 raises or lowers the base of the yoke 204 thereby providing vertical adjustment of the position of the plate 116. The bolts 210 and the pin 208 provide horizontal adjustment of the plate 116.

The scanning discs D-1 and D-2 (see FIGS. 9 and 10) are identical in construction and each comprises a circular glass plate 230 having an opaque emulsion 232 on one surface with the exception of four transparent arcuate portions 234, these arcuate portions providing a substantially uniform scanning aperture area in cooperation with the slit s-1 or s-2. Each disc is received within a two-part hub 236 bolted to a flange 238 of the shaft 142 or 180, as the case may be. Rotation of the shaft therefore causes rotation of the scanning disc.

*Mounting bridge*

Figures 11, 12, 13:
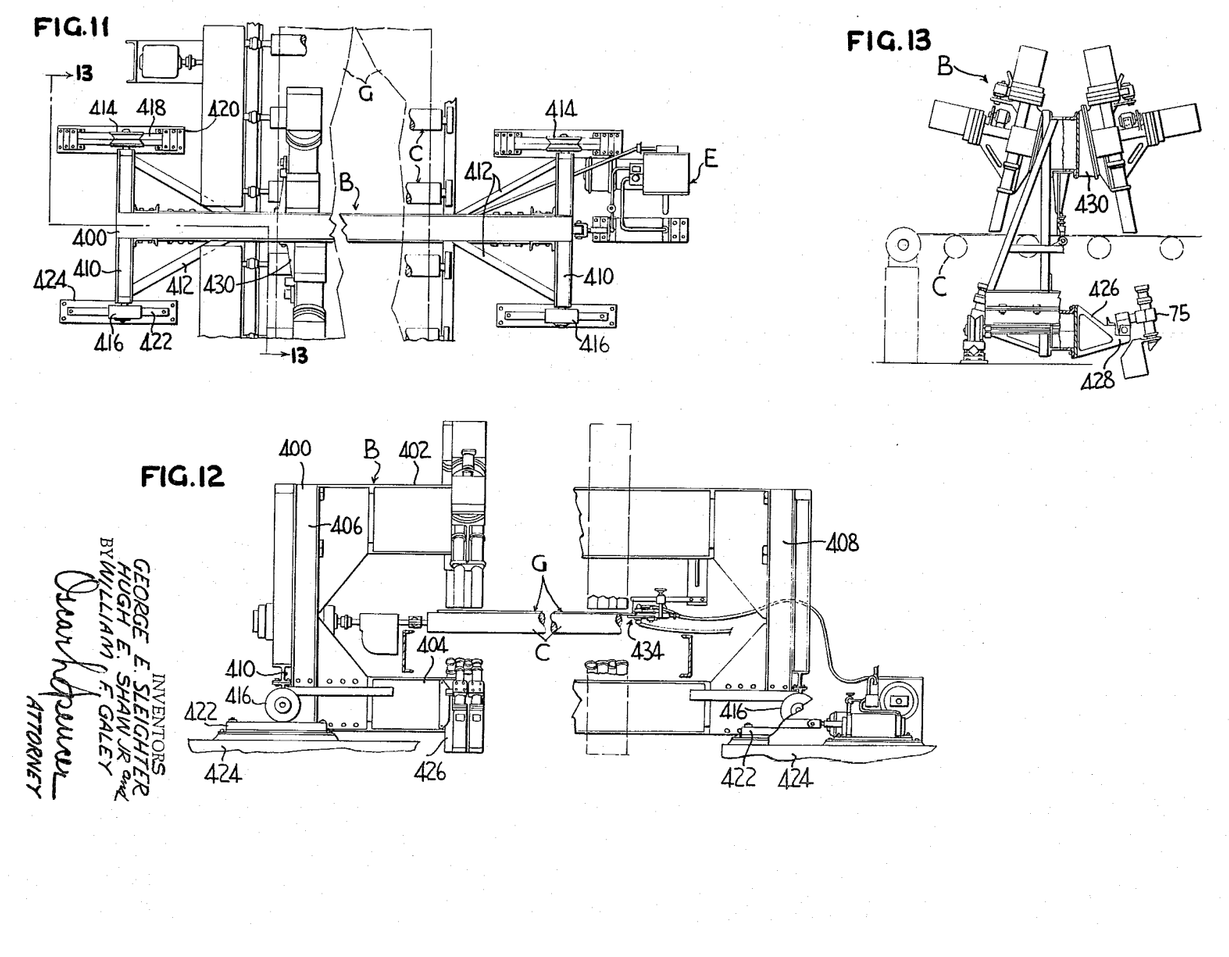
FIG. 11 is a partial plan view of a transversely movable mounting bridge and illustrating the manner of mounting the inspection devices of this invention adjacent the plane of the glass.
FIG. 12 is a partial elevation of the structure illustrated in FIG. 11.
FIG. 13 is a view taken on line 13—13 of FIG. 11.

Attention is now directed to FIGS. 11, 12 and 13 showing the mounting bridge, generally identified as B, mounted for limited transverse movement relative to the glass G conveyed by a conventional roller conveyor C. As will be explained, the movement of the bridge B is controlled by the edge position of the glass G, this being accomplished by means of an edge position control device, identified on the drawings as E. Construction of the bridge B in this manner insures correlation of defect locations with the glass.

The bridge B comprises a substantially rectangular framework 400 which includes upper and lower structural members 402 and 404, respectively, joined adjacent their opposite ends by vertical structural members 406 and 408. The glass G is conveyed, by the conveyor C, through the framework 400, as is illustrated in FIG. 12. Horizontal end members 410 are connected to the framework 400 by bolts and braces 412. One terminal end of each end member 410, as the upper ends in the plan view, FIG. 11, carries a grooved roller or wheel 414 and the other terminal end of each end member 410, as the lower ends in FIG. 11, carries a smooth roller or wheel 416. The wheels 414 roll on tracks 418 of diamond section connected to upstanding supports 420, and the wheels 416 roll on flat tracks 422 connected to upstanding supports 424, the supports 420 and 424 supporting the structure from the floor of the building in which the device is housed. The construction of the tracks and rollers allows expansion and contraction of the device because of changes in temperature without affecting its operation.

Each light source S and its associated housing is connected to the bridge B by its bracket 75 and a bracket 426 connected to the lower structural member 404 of the framework. A swivel joint 428 between the brackets 426 and 75 provides for establishment of a preferred optic axis. In a similar manner, each scanning device is connected to the bridge B by an angular bracket 430 connected to the base of its main casting 100 and the member 402. In order to provide complete scanning of the glass, space considerations dictate that alternate scanning devices and their associated light sources be connected to opposite sides of the framework 400.

Figure 14:
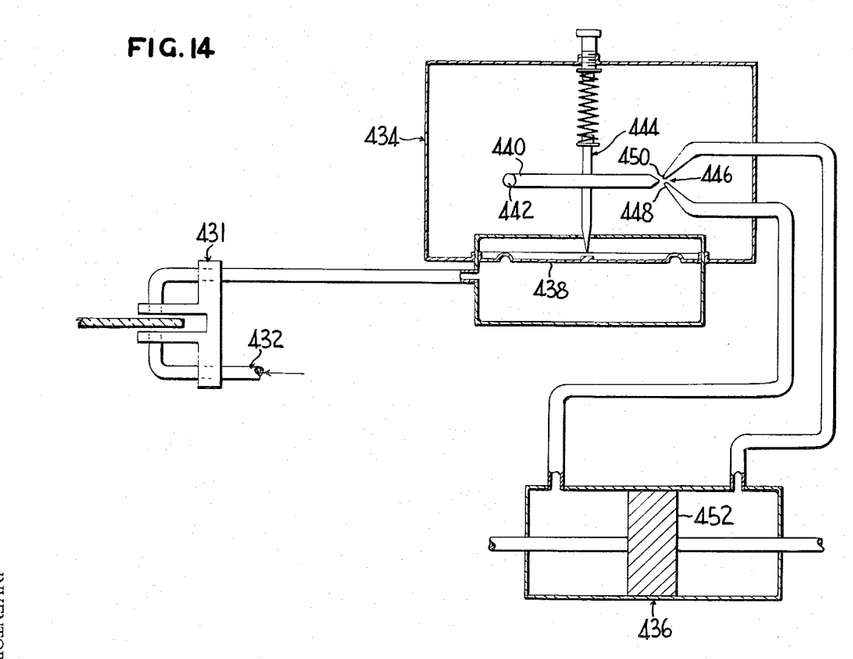
FIG. 14 is a schematic of an edge control device to maintain the bridge in a predetermined location relative to the glass.

It is desirable to provide the same scanning pattern for each transverse increment of glass, but strip material, such as glass, has a tendency to shift transversely on the conveyor producing a wavy edge path. To be able to correlate defect information with their actual locations even though the glass shifts transversely of a predetermined path, an edge control means E is employed. A schematic diagram of the control means E is illustrated in FIG. 14 should be referred to along with FIGS. 11, 12 and 13.

The edge position control device E comprises a sensing nozzle 431, a constant pressure air supply means 432, a regulator 434 and a work cylinder 436. The regulator 434 includes a diaphragm 438, a pivoted jet pipe 440, a fluid inlet 442; a spring adjuster 444 and a distributor block 446. One side of the diaphragm is acted upon by air pressure from the sensing nozzle while the other side is acted upon by the spring adjuster 444 which has connected thereon the jet pipe 440. The jet pipe may be pivoted about the inlet 442. The distributor block 446 is provided with a pair of closely spaced orifices 448 and 450 connected respectively to opposite ends of the work cylinder 436. The piston 452 of the work cylinder 436 is connected to the framework 400 of the bridge B, so that upon movement of the piston 452 there is corresponding transverse movement of the structure 400.

The jet pipe 440 discharges a high-velocity jet of fluid at the two orifices 448 and 450. The constant pressure air supply blows low pressure air across the edge of the glass G which inpinges on the sensing nozzle 431 where a part of the air pressure is recovered. The edge of the glass placed in the nozzle reduces the recovered pressure which is applied to the diaphragm. The farther edge moves into the nozzle, the less pressure is recovered and vice versa.

The jet pipe 440 when balanced by the spring adjuster 444 on one side and the position signal in the form of recovered pressure on the diaphragm on the other side the jet pipe 440 discharges its fluid equally to the orifices 448 and 450. The pressures at the opposite ends of the work cylinder are equal, the edge of the glass is where it is supposed to be and the bridge B remains stationary. When the edge of the glass shifts, the jet pipe becomes unbalanced and pivots, so as to discharge more fluid to one of the orifices 448 and 450 than the other. More fluid is recovered at one end of the work cylinder than the other and the piston moves to move the bridge B and correct the edge position of the glass relative to the scanning devices.

Typical edge control devices and various components are shown in U.S. Patents Nos. 2,539,131; 2,785,659 and 2,813,535.

*Scanning pattern*

Figures 15, 16:
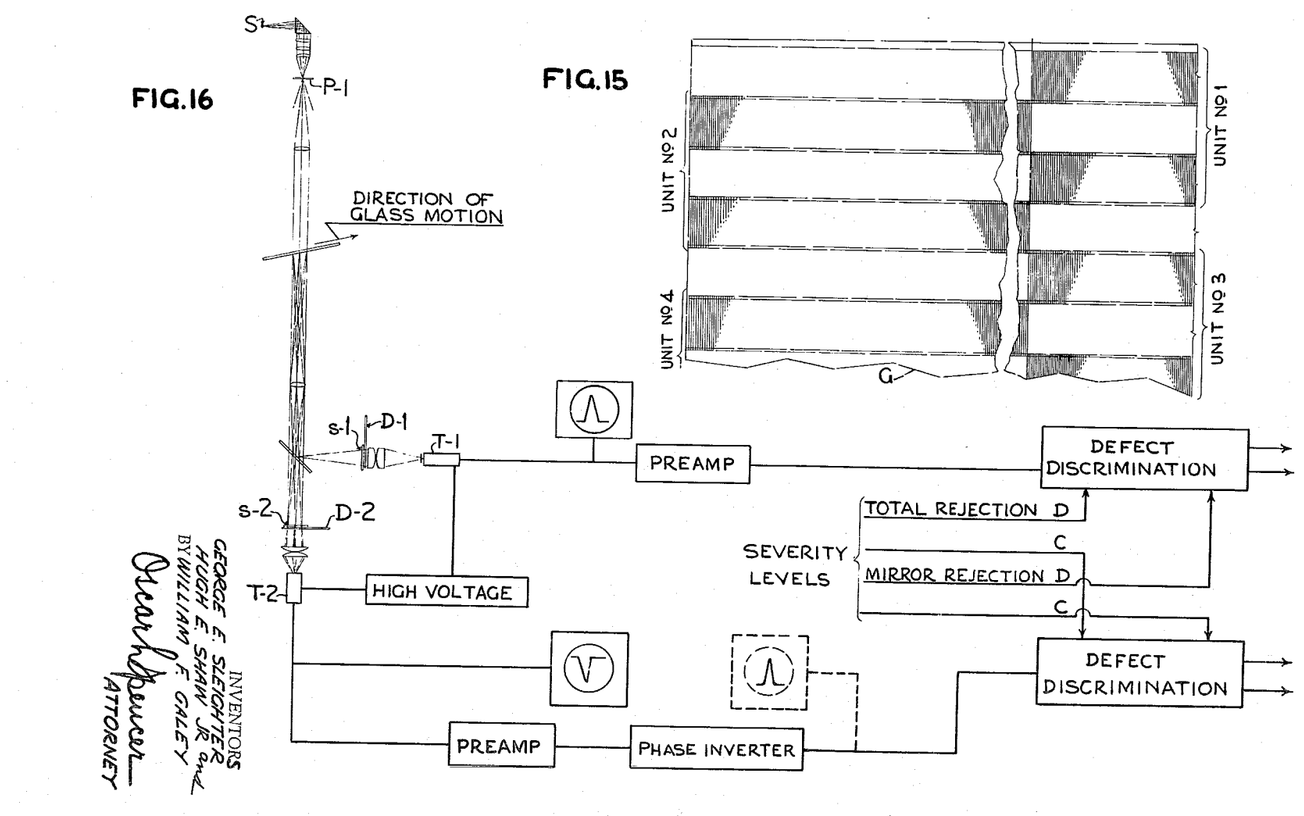
FIG. 15 is an illustration of the scanning pattern of devices constructed in accordance with the teachings of this invention.
FIG. 16 is a block diagram of the combined scanning assembly and electrical circuitry associated therewith to provide signals indicating defect location and severity.

The scanning pattern shown in FIG. 15 is the same for each component of the combination scanning device and also for individual scanning devices. The rotating scanning discs D-1 and D-2 traverse the slits s-1 and s-2 and provide scanning apertures which scan paths extending across the glass. These scanning paths combined with glass movement provide a sequential scan pattern, as illustrated. Each device is useful for only a portion of the width of the glass, so that to inspect the entire width of the glass, a plurality of devices are used, giving rise to an overlap of adjacent patterns, which insures at least 100% scanning of the usable width of the glass, whether it be in sheet or ribbon form. The edge control means E insures scanning of longitudinal portions of the glass in a fixed relation to an edge of the glass.

*Circuitry, circuitry operation and functions*

Turning now to FIG. 16, the schematic block diagram showing a complete, combination scanning assembly, of which there are a plurality in the preferred system, we see the relation of the light source S and associated parts and the combined scanning device to the glass G. There is also indicated a high voltage D.C. source, a preamplifier for each section of the scanning device, both preferably of the cathode follower variety, a phase-inverter for the type D defect section, and a discriminator for each section. Each of these electrical components is of conventional construction and requires no detailed description of specific circuits. Note, that if desired, an oscilloscope may be included for each of the sections, so that signal patterns can be visually observed. The signal patterns shown on the representations of the oscilloscope screens on the drawing are typical patterns when types C and D defects are present in and on the glass being inspected.

The light intensity variations, as seen by the effective scanning apertures provided by the scanning discs D-1 and D-2 traversing the slits s-1 and s-2, respectively, are picked up by the light sensitive elements, the photomultiplier tubes T–1 and T–2, respectively, which generate a voltage of varying amplitude and frequency directly related to the defect severity in or on the inspected glass. The high voltage D.C. supply furnishes the voltage for the tubes' dinodes and the necessary plate voltage. The signals generated by the tubes T–1 and T–2, patterns of which may be visually observed on the screens of the respective oscilloscopes, are amplified to a desired level by the preamplifiers, preferably placed in close proximity to the tubes T–1 and T–2, to amplify the low level signals before they are subjected to external disturbances, such as stray voltage pickup. A cathode-follower variety of preamplifier is preferably used, so that the signals may be transferred through long lines without danger of losing high frequency response to line capacity. Also, the use of the cathode-follower reduces the possibility of stray A.C. pickup and cross talk.

The phase inverter is connected to the preamplifier in the type D defect section of the combined scanning assembly. As previously stated, type D defects will show, at the plane of the scanning disc D–2, as light spots on a dark field giving rise to negative voltages. The phase-inverter changes the negative voltages to positive voltages for subsequent use.

The discriminators receive the voltages from the two scanning sections and supply information to a device or devices for use in determining the optimum cutting of the glass into commercial size sheets. Because there are three qualities of glass, i.e., mirror, glazing and total reject, the discriminator must supply information related to defect severity. Thus, the information supplied is in the form of signals indicating mirror reject quality and total reject quality. The highest severity indication from either section of the combined scanning assembly will govern the classification of the glass considered.

To provide the desired information, the discriminator includes comparator circuits which compare the signals fed thereto from each of the sections of the combined assembly with preset voltages representing severity rejection levels. Establishment of the preset voltages is determined from knowledge of acceptable quality levels.

OPERATION

The defects of type C, as previously stated, are those of the point type, which may be within the glass, i.e., of the inclusion type, or may be present at the surface of the glass. Inclusion type defects include stones, boils, blisters and seeds, and surface point type defects include sand holes and bloach. The defects of type D, as previously stated, are gross linear surface defects, broadly classified into scratches and sleeks.

When light from a source is passed through defect-free glass and intercepted by an objective lens, a projected image of the glass is formed, which projected image has a substantially uniform light field. When defects of type C are present in and on the glass, such defects will show as dark spots on the light field because they absorb light or have extremely short focal lengths. Severity of defect is indicated by the intensity and size of these dark spots. If there are type D defects present, they will deviate or scatter some of the light and will show on this light field in much reduced intensity contrast because they affect the rays producing the projected image to a much lesser extent. Therefore, it is necessary to detect the presence and severity of type D separately and it becomes necessary to separate the principal rays of light from the scattered rays of deviated rays of light. When thus separated, the objective lens can be made to simultaneously present images of the glass, one showing C defects and the other showing D defects. Unlike the image formed by the principal light, the image showing type D defects will have a dark field with representations of D defects, if present, appearing as light spots.

The separation of the principal light from the deviated or scattered light is accomplished in the preferred embodiment by the use of the light beam separator taking the form of the glass plate with the mirrored center portion, the principal light being reflected by the mirror while any deviated or scattered light passes through the glass plate.

The slits $s$–1 and $s$–2 are aligned transversely of the glass, and the discs D–1 and D–2 traverse the slits $s$–1 and $s$–2, respectively, allowing only a portion of the light beams to pass and impinge on the photomultiplier tubes T–1 and T–2. The use of the slits $s$–1 and $s$–2 and the scanning discs D–1 and D–2 enhance the signal to noise ratio and provide a usable system.

The photomultiplier tubes convert light into usable electrical energy which is directly proportional to the light transmitted by the combination slits and discs.

The electrical energy in the form of signals of varying amplitude and frequencies, dependent upon defect severity, are amplified and fed as positive signals into the discriminator which supplies signals indicative of glass quality. The latter signals are fed into a device or devices for ultimate use in determining the optimum cutting of the glass. Such device or devices may include a recorder or a storage device which feed the information upon demand to a computer or to a marking device which marks defect areas directly on the glass.

In the entire system, there are a plurality of the scanning assemblies arranged transversely of the glass, each assembly providing information as to glass quality in a longitudinal area fixed with regard to the edges of the glass. The number of such assemblies in the system are dependent on mechanical considerations and preferably are such to correspond with the ultimate end desired, i.e., the determination of defect severity and location in a matrix of a desired, usually predetermined size, generally related to accepted glass cutting practices.

For inspecting a ribbon or plate of glass 127 inches in width, traveling on a conveyor at speeds of 3.6 inches/second or 5 inches/second, depending on the thickness of the glass, i.e., ¼ inch or ⅛ inch, respectively, a number of scanning units are employed arranged transversely of the conveyor and the glass path. There is one scanning unit for each matrix width or one scanning assembly (side-by-side scanning units) for each pair of matrix widths.

For each scanning unit for detecting type C defects, th plate P–2 is provided with a slit having a width of 0.018 inch and a length of 2.045 inches, while for each scanning unit for detecting type D defects, the plate P–3 is provided with a slit having a width of 0.018 inch and a length of 2.040 inches. These slits are radially disposed from the axes of the scanning discs D–1 and D–2 and are aligned such that their length is perpendicular to the direction of glass flow. The fixed slits $s$–1 and $s$–2 work in conjunction with each scanning disc D–1 and D–2 in such a manner that a single disc can cooperate with two slits. Each fixed slit $s$–1 or $s$–2 is separated from a scanning disc by approximately 0.007 inch, and the discs D–1 and D–2 each rotate at approximately 8600 r.p.m. The transparent arcuate portions of each scanning disc are congruent sections of a logarithmic spiral, and being four in number, they are disposed at 90 degree intervals on each disc. The basic equation for the logarithmic spiral is:

$$P = K e^{ae}$$

where:

$a = .71662$
$K = .9806$
$e = 2.7183$
$e$ is expressed in radians.

The spiral transparent portions of each disc are positioned with reference to the fixed slits such that the resulting aperture will be substantially constant in area regardless of its radial displacement from the axis of rotation of each disc.

As has been previously indicated, each of the scanning devices combined in the preferred embodiment could be constructed as a separate unit. For the device for determining the location and severity of type C defects only, no light beam separator would be used because of the negligible effect that scattered light rays have on the system. For the device for determining the location and severity of type D defects, the mirror would be replaced by a light trap, so as to eliminate the principal beam of light.

The foregoing invention has been described with particular reference to the inspection of ground and polished plate glass for determining the location and severity of the various enumerated defects. The invention may, however, be used to locate defects of similar nature, i.e., size, distribution, optical properties, etc., which may impair the quality of other materials, for example, sheet glass, plastics and other materials of various shapes and forms. For example, glass produced by the float process, i.e., by floating a layer of glass upon a molten bath of metal to produce a flat ribbon or sheet may be inspected in the manner above described. Such inspection is particularly applicable when the glass is undercleaned, i.e., when the surface of the glass in contact with the molten metal is polished, either mechanically with abrasives or chemically with etching-type solutions. However, it is also applicable even when the glass is not undercleaned, inasmuch as inclusions, surface point type defects and surface scratches can occur in glass produced by the float process independently of undercleaning.

We claim:

1. A method of simultaneously detecting the presence of defects in and on a piece of glass having extensive, sensibly smooth surfaces that are substantially planar in the instant test area, which absorb light or have extremely short focal lengths and defects on the surfaces of such glass which scatter light comprising, passing a beam of light from a given source through said glass, separating the rays of light including those rays of light affected by said first-named defects from the scattered rays of light because of said second-named defects, projecting images of said glass intercepted by said beam, one image having a light field with any first-named defects showing as dark spots and the other image having a dark field with any second-named defects showing as light spots, simultaneously scanning both images allowing incremental portions only of any light of intensity differing from the field to pass, and directing said light of different intensities on light sensitive elements responsive to said light of different intensities to thereby provide signals indicative of the presence of said defects.

2. A method as recited in claim 1, wherein the severity of said defects is proportional to the size of the spots and the resultant signals are thus also indicative of the severity of the defects, and further including electrically comparing the signal with preset signal levels to thereby determine the severity of the defects.

3. A method as recited in claim 2, further including moving said glass along a predetermined path relative to said beam of light so as to determine the location and severity of defects in a longitudinal area of said glass.

4. Apparatus for simultaneously detecting the presence of defects in and on a piece of glass having extensive, sensibly smooth surfaces that are substantially planar in the instant test area, which absorb light or have extremely short focal lengths and defects on the surfaces of such glass which scatter light comprising, a source of light of given intensity positioned so as to provide a beam of light intersecting the glass, means for separating scattered rays of light from the remaining other rays of light, means for projecting images of said glass intersected by said beam, one image formed by the rays of light separated from scattered rays of light having a light field with any first-named defects showing as dark spots and the other image formed by the scattered rays of light having a dark field with any second-named defects showing as light spots, means for simultaneously and separately scanning both images, means for allowing incremental portions only of any light of intensity differing from the fields to pass, light sensitive elements operatively associated with each of said scanning means, and means to direct the light of different intensities on said light sensitive element, said light sensitive elements being responsive to light of different intensities to thereby provide separate signals indicative of the presence of said defects.

5. Apparatus as recited in claim 4, wherein the severity of said defects is proportional to the size of the areas of light of intensities differing from the field of said images and the signals are also thus indicative of the severity of the defects, and further including a means operatively connected to each of said light sensitive elements to compare the signals therefrom with preset signal levels to determine the severity of the defects.

6. Apparatus as recited in claim 4, wherein said means for separating said scattered rays of light includes a beam separator comprising a transparent member having a reflective portion, said transparent member being so positioned to allow passage of said scattered rays of light and said reflective portion being so positioned to reflect said separated rays of light.

7. Apparatus for simultaneously detecting the presence of defects in and on a piece of glass having extensive, sensibly smooth surfaces that are substantially planar in the instant test area, which absorb light or have extremely short focal lengths and defects on the surfaces of such glass which scatter light comprising, a conveyor for transporting such glass along a predetermined path, a source of light of given intensity positioned so as to provide a beam of light intersecting the glass so transported, a beam separator aligned with the optic axis of said light source for separating scattered rays of light from the remaining other rays of light, means for projecting images of said glass intersected by said beam, one image formed by the separated rays of light having a light background with any first-named defects showing as dark spots and the other image formed by the scattered rays of light having a dark field with any second-named defects showing as light spots, means for simultaneously separately scanning both images, means for allowing incremental portions only of any light of intensity differing from the fields to pass, said scanning means each including a fixed slit and a rotary apertured disc traversing said slit and means to rotate each apertured disc, a light sensitive element associated with each scanning means, means to direct any light of different intensities on said light sensitive elements, said light sensitive elements being responsive to light of different intensities to thereby provide separate signals indicative of the presence of said defects, said signals also being indicative of the severity of each defect detected, and means to compare said signals with preset signal levels to provide information of the severity of said defects and their presence.

8. Apparatus as recited in claim 7 wherein said slits are positioned to extend generally transversely of said glass path and said aperture is elongated and arcuate in shape, said slit and said aperture cooperating to provide during a traverse of said slit by said aperture a substantially constant area for the passage of said light of differing intensities.

9. Apparatus as recited in claim 8, further including a bridge disposed substantially transverse to said glass path and a plurality of said detecting apparatus mounted on said bridge, each for detecting the presence and severity of defects in and on a predetermined longitudinal area of said glass and means for moving said bridge substantially transverse to said glass in response to changes in the transverse positions of said glass transported along said path to thereby insure the continued scanning of said predetermined longitudinal area of said glass.

10. Apparatus as recited in claim 9, wherein said source of light is positioned adjacent one major surface of said glass to project its beam through said glass, and said scanning means, light sensitive elements and directing means are positioned adjacent the other major surface of said glass, and the optic axis of said light source is angled relative to said glass path.

11. Apparatus for detecting the presence of defects in and on the surface of a piece of glass having extensive, sensibly smooth surfaces that are substantially planar in the instant test area, comprising: a source of light of given intensity positioned so as to provide a beam of light intersecting said glass; means, including an objective lens, for presenting images of said defects formed by said beam; means, including a light sensitve element aligned with said beam, responsive to variations in light intensity of said beam which forms said images to provide signals indicative of the presence and location of said defects; and means in the path of light between said source and said light sensitive element to interrupt the major portion of said light beam and permit a small portion only of said light beam, correlated in size with a maximum acceptable defect size so as to indicate by perceptible intensity differences in said increments of light the presence of any larger defect, to impinge upon said light sensitive element.

12. A method of detecting the presence of defects on the surfaces of a piece of glass having extensive, sensibly smooth surfaces that are substantially planar in the instant test area, which defects scatter light, comprising passing a beam of light from a given source through said glass, separating scattered portions of said light beam from unscattered portions after said beam has passed through the glass; projecting at a predetermined focal plane an image of any surface defects which scatter light, said image being in the form of light spots of varying intensities on a dark field; scanning said resultant image at said focal plane and allowing incremental portions only of any light present to pass said image plane, said incremental portions being of a size correlated with a maximum acceptable defect size so as to perceptibly vary in intensity in response to the presence of any larger defect; and directing said incremental portions of light onto a light sensitive element responsive to light of varying and different intensities to thereby provide signals indicative of the presence of said defects on said glass surfaces.

13. A method as recited in claim 12 wherein the severity of said defects is proportional to the size of the spots and the signals are thus also indicative of the severity of the defects, and further including electrically comparing the signals with preset signal levels to determine the severity of the defects.

14. Apparatus for detecting the presence of defects on the surface of a piece of glass having extensive, sensibly smooth surfaces that are substantially planar in the instant test area, which defects scatter light, comprising a source of light of given intensity positioned so as to provide a beam of light intersecting a glass sheet or ribbon; means, including an objective lens, for presenting, at a predetermined focal plane, images of said light scattering defects of said glass; a beam separator for separating scattered portions of the beam from unscattered portions after the beam has passed through the glass; a light sensitive element responsive to light of different intensities than the image field; means to scan said dark image field and allow any light of different intensity to pass said scanning means; and means to direct said light of different intensity onto said light sensitive element so as to provide signals indicative of the presence of such defects on the surface of said glass.

15. Apparatus as recited in claim 14 wherein the severity of said defects is proportional to the size of the areas of light of intensities differing from the field of said image and further including means to compare the signals with preset signal levels to determine the severity of the defects.

16. The method of detecting the presence of defects in and on a piece of glass having extensive, sensibly smooth surfaces that are substantially planar in the instant test area, which defects absorb light or have extremely short focal lengths, comprising passing a beam of light from a given source through said glass; projecting an image of said glass intercepted by said beam of light at a predetermined focal plane, said image having a light field with any defects shown as dark spots to the size of which the severity of the defects is proportional; scanning said image at the focal plane; allowing incremental portions only of light to pass said image plane, said incremental portions being of a size correlated with a maximum acceptable defect size so as to perceptibly vary in intensity in response to the presence of any larger defect; directing said incremental portions of light onto a light sensitive element responsive to differences in light intensity to provide signals indicative of the presence of said defects in and on said glass; and electrically comparing said signals with preset signal levels to determine the severity of the defects.

17. Apparatus for detecting the presence of defects in and on the surface of a piece of glass having extensive, sensibly smooth surfaces that are substantially planar in the instant test area, which absorb light or which have extremely short focal lengths, comprising a source of light of given intensity positioned so as to provide a beam of light intersecting a glass sheet or ribbon; means, including an objective lens, for presenting an image of said glass intercepted by said light beam at a predetermined focal plane; a light sensitive element; means to scan said image and allow increments of light correlated in size with a maximum acceptable defect size to pass said image plane so as to indicate, by perceptible intensity differences in said increments of light, the presence of any larger defect; means to direct said increments of light onto said light sensitive element, said light sensitive element providing signals in response to the impingement of said light of different intensities indicative of the presence and severity of such defects; and means to compare the signals with preset signal levels to determine the severity of the defects.

18. Apparatus for detecting the presence of defects in and on the surface of a piece of glass having extensive, sensibly smooth surfaces that are substantially planar in the instant test area, which absorb light or which have extremely short focal lengths, comprising a source of light of given intensity positioned so as to provide a beam of light intersecting a glass sheet or ribbon; means, including an objective lens for presenting an image of said glass intercepted by said light beam at a predetermined focal plane, means to scan said image and allow increments of light correlated in size with a maximum acceptable defect size to pass said image plane so as to indicate, by perceptible intensity differences in said increments of light, the presence of any larger defect; means, including a light sensitive element, to provide signals in response to impingement of light of different intensities indicative of the presence and location of such defects; and means intermediate said scanning means and said last mentioned means to direct increments of light passing said image plane onto said light sensitive element.

No references cited.

JEWELL H. PEDERSEN, *Primary Examiner.*